March 3, 1936.  P. L. BUSH ET AL  2,032,737

PEACH PITTER

Filed Dec. 26, 1933  2 Sheets-Sheet 2

Inventors
Philip L. Bush
Frank Ruediger
By Lyon & Lyon
Attorneys

Patented Mar. 3, 1936

2,032,737

UNITED STATES PATENT OFFICE 2,032,737

PEACH PITTER

Philip L. Bush, San Francisco, and Frank Ruediger, Oakland, Calif., assignors to Pacific Machinery Company, San Francisco, Calif., a corporation of California Application December 26, 1933, Serial No. 703,954

9 Claims. (Cl. 146—28)

This invention relates to fruit pitters, and more particularly to a device adapted for the removing of pits from previously "split" or halved fruit sections such as peaches.

This invention is addressed to an improvement in the form of peach pitter as illustrated in the copending application of Albert R. Thompson for Fruit pitting machine with vibratory pitting means, Serial No. 654,002, filed January 28, 1933.

An object of our invention is to provide a fruit pitter for the removing of pits from half fruits such, for example, as clingstone peaches in which means are provided for the mounting of a curved pitting knife so as to permit the rotation of the curved pitting knife into the flesh of the fruit to remove the pit, for vibrating the pitting knife as it is so rotated so as to increase the efficiency of the pitting knife in removing the pit, and means for adjusting the arc of travel of the pitting knife so as to determine the depth of cut made by the pitting knife.

Another object of this invention is to provide a fruit pitter including a pitting knife and means for rotating the pitting knife, and means operable to permit the curved pitting knife to pass more deeply into the flesh of the fruit in cutting the pit therefrom should the pitting knife tend to hang up or snag upon the pit of the fruit.

Another object of this invention is to provide a fruit pitting knife, the shank of which is provided with means for imparting to the knife an oscillatory or vibratory motion, and a means mounted upon the shank for rotating the pitting knife as it is so oscillated.

Other objects and advantages of this invention it is believed will be apparent from the following detailed description of a preferred embodiment thereof as illustrated in the accompanying drawings.

Figure 1:
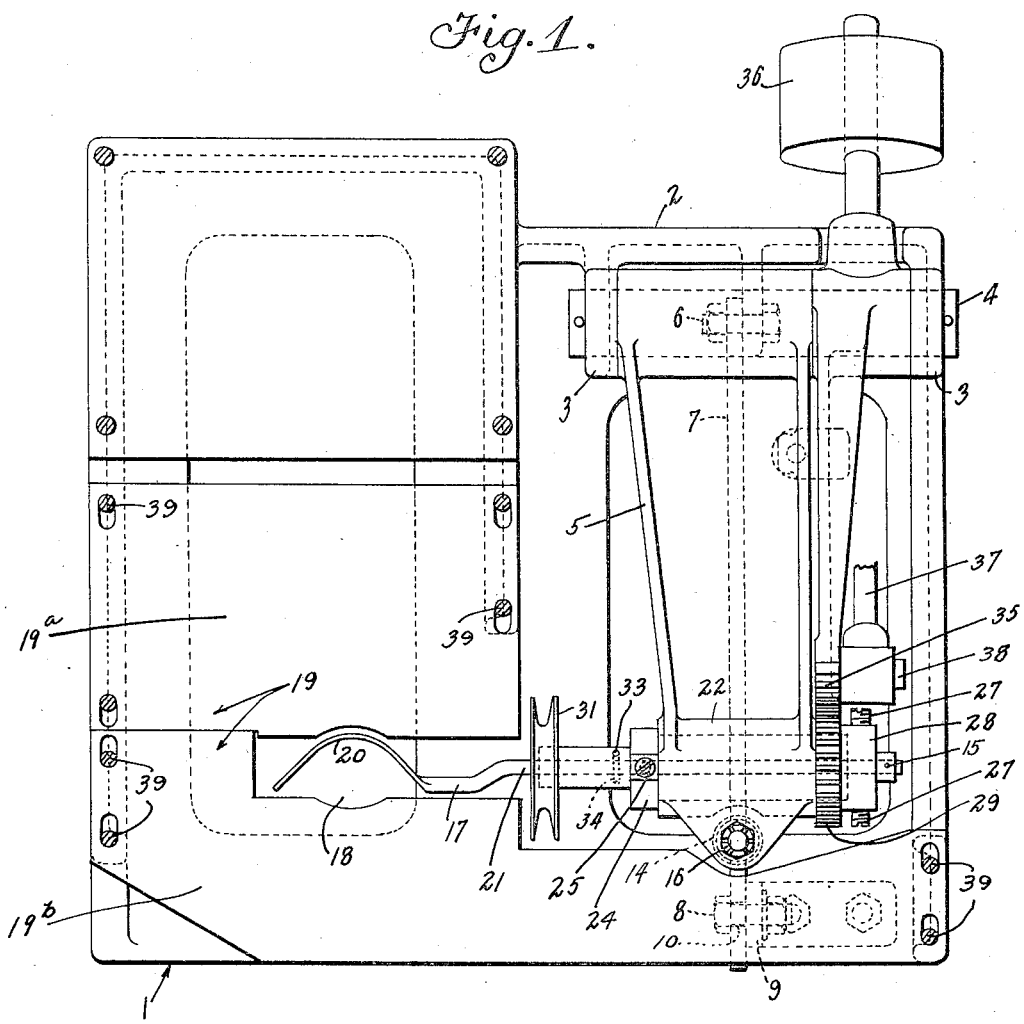
Figure 1 is a top plan view of a fruit pitter embodying our invention.
Figure 2:
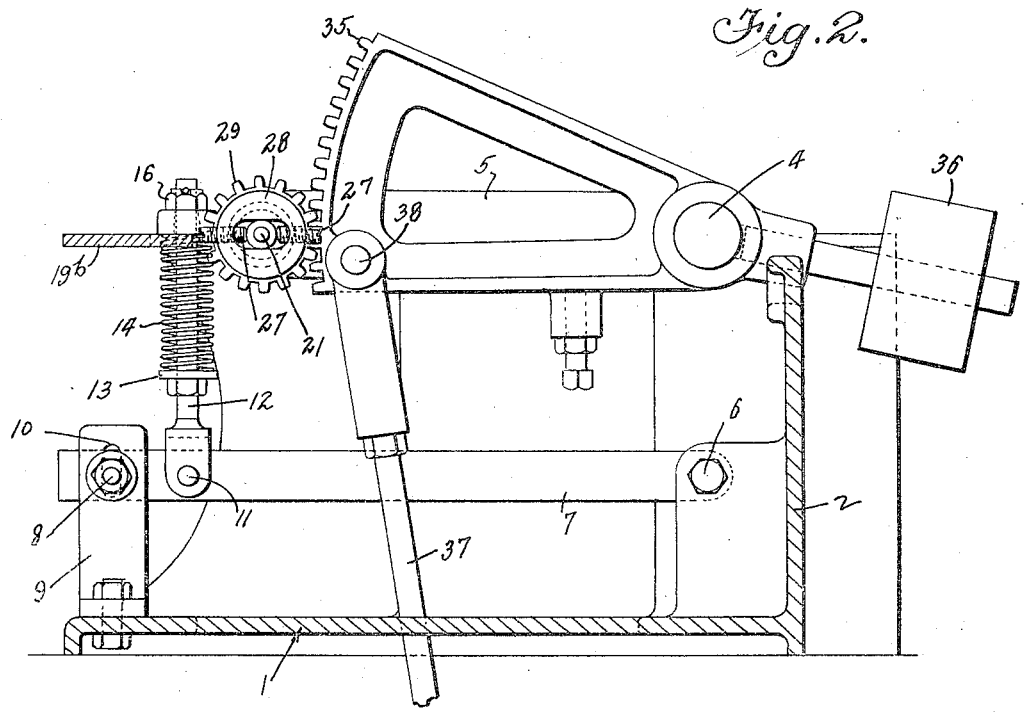
Figure 2 is a side elevation thereof partly in vertical section.
Figure 3:
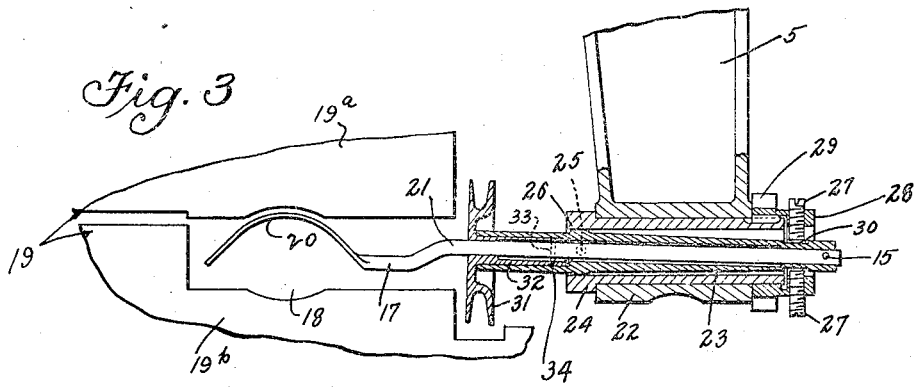
Figure 3 is a detached and enlarged view partly in horizontal section of the fruit pitting blade and holding means embodied in our invention.

In the preferred embodiment of our invention as disclosed in the accompanying drawings, I indicates a frame plate which may be of any suitable or desirable construction which is adapted to be positioned upon a pitting table or any other suitable support. Supported by the upwardly extending portion 2 of the frame plate I in ears 3, is a pivot pin 4.

Journaled upon the pivot pin 4 is a pitting knife supporting arm 5 which is supported above the plate I in substantially horizontal position and is held in substantially horizontal position at its forward end yieldably so as to permit the pitting knife which it supports to yield downwardly during its operation so that the pitting knife may pass more deeply into the flesh of the fruit.

In order to provide for this operation and likewise to provide for adjustment of the normal path of movement of the knife, the pitting knife supporting arm 5 is yieldably and adjustably supported at its forward end preferably by the following means:

Secured to the frame plate I at a pivot 6 is an arm 7 which extends forwardly of the frame plate I and is adjustably secured by means of a bolt 8 to a bracket 9. The bolt 8 fits within a slot 10 formed in the bracket 9 so that the vertical position of the forward end of the arm 7 may be adjusted. Secured to the arm 7 at a pivot 11 is a rod 12 which extends upwardly from the arm 7 and passes through a hole formed in the forward end of the supporting arm 5.

A stop 13 is secured to the rod 12 and interposed between the stop 13 and the under surface of supporting arm 5 is a spring 14. The rod 12 passes freely through the supporting arm 5 and is provided with a stop nut 16 above the arm 5. By this construction the initial path of travel of the pitting knife carried by the supporting arm 5 may be adjusted and by the yieldable support provided by the spring 14 the pitting knife may cause the supporting arm 5 to move downwardly under the influence of the spring 14 when the pitting knife tends to hang up or snag on the pit of the fruit.

The pitting knife 17 supported by the supporting arm 5 extends into a position of normal operation in a pit opening 18 formed in the pitting plate 19. The opening 18 in the pitting plate 19 permits visibility of the pit of the fruit and permits the operator of the device to locate the pit of the friut with relation to the curved portion 20 of the pitting knife at the start of the pitting operation. The curved portion 20 of the pitting knife 17 is normally in position in the plane of the plate 19 or in horizontal position, and in operation passes downwardly through the opening 18 around the pit of the fruit to sever the pit of the fruit from the flesh thereof.

The pitting knife 17 includes also a shank 21 which is adjustably mounted in a carrier bearing 22 provided at the end of the supporting arm 5 in such a manner as to permit adjustment of the path of movement of the pitting knife 17 and likewise so as to permit the imparting to the pitting knife 17 of an oscillatory or vibratory motion during its action to sever the pit from the flesh of the fruit.

In order to provide for this operation, we prefer to mount the shank 21 of the pitting knife in a hollow shaft 23 and to support the hollow shaft 23 within a bearing sleeve 24. The bearing sleeve 24 is journaled within the bearing 22 formed at the end of the supporting arm 5. The bearing sleeve 24 is secured to the hollow shaft 23 by means of 180° spaced securing pins 25 which permit the rocking of the hollow shaft 23 within the bearing sleeve 24 upon the ball surface 26 provided on the hollow shaft 23. At the opposite end of the bearing sleeve 24 there is provided a pair of 180° spaced adjustment pins 27 which are threadedly secured to the hub 28 of the pinion 29. The adjustment pins 27 are preferably provided with ball or circular ends that engage within a recess 30 formed within the end of the hollow shaft 23. By adjusting the pins 27 in their threaded connection within the hub 28 of the pinion 29, the axial position of the pitting knife in the plane of the pitting plate 19 may be adjusted so as to vary the arc of travel of the curved portion 20 of the pitting knife 17 as the pitting knife is rotated.

In order to provide for the vibration of the pitting knife 17, there is mounted upon the shank 21 thereof a pulley or wheel 31 which is journaled on an axis eccentric to its center upon the shank 21 of the pitting knife 17. The eccentrically mounted pulley is provided with an elongated hub 32 which extends into a receiving recess formed in the hollow shaft 23 and is held in position against longitudinal movement by means of a lock pin 33 passed through the hollow shaft 23 into a circumferential groove 34 formed in the hub 32. The pulley or eccentrically journaled wheel 31 is adapted to be driven at a relatively high speed of substantially 3500 to 4000 R. P. M. from any suitable source such, for example, as an electric motor or the line shaft of the pitting plant wherein the pitters are used, or from any other suitable or desirable source.

In order to rotate the pitting knife 17, there is journaled on the pin 4 a weighted gear segment 35 which meshes with the pinion 29 and is normally counterweighted by a counterweight 36 in such a manner as to normally hold the curved portion of the pitting knife 17 in the plane of the pitting plate 19. The gear segment 35 is adapted to be actuated by a foot treadle which is operatively connected with a foot treadle rod 37 which is pivotally connected at a pin 38 to the gear segment 35.

The normal operation of the fruit pitter embodying our invention is that previously split or halved fruit are held by an operator with their cut surface uppermost against the under surface of the pitting plate 19. The operator locates the pit of the fruit with relation to the curved portion 20 of the pitting knife 17 so that the pitting knife will just clear the pit. He then operates the foot treadle to actuate the gear segment 35. The gear segment 35, operating through the pinion 29, rotates the pitting knife through approximately 180°. On release of the foot treadle, the weight 36 returns the pitting knife 17 to its normal position in the plane of the plate 19. As the pitting knife 17 is rotated, it is vibrated by the vibratory movement imparted thereto by the eccentrically journaled wheel or pulley 31 so that during its operation to remove the pit the pitting knife is given a movement such that any point of the knife during its rotation has a circular movement, the intensity of which, depends upon the eccentricity of the hole in pulley 31, and also upon the speed of the pulley.

In case the curved portion 20 of the pitting knife 17 hangs up or snags upon the pit of the fruit, the pitting knife yields to permit the same to pass over the obstruction by compressing the spring 14, which yieldably holds the knife normally in the plane of the plate 19.

In case larger or smaller pits are being removed from the fruit, the path of movement of the curved portion 20 of the pitting knife 17 may be adjusted either through the adjustment bolt 8, which determines the normal starting position of the pitting knife 17, or the pitting knife may be given a different path of movement by the adjustment provided through the pins 27.

As pits of the fruit may vary in size, and as it is desirable to support the cut surface of the fruit during the pitting operation, the pitting plate 19 is preferably formed in sections and supported by the frame 1 so that the opening 18 may be enlarged or decreased in size, depending upon the pits of the fruit being operated upon. The plate 19 is also made adjustable so that as the curved portion of the pitting knife is changed, the plates 19ª and 19ᵇ may be moved to such position that the pitting knife just clears them in its rotation.

In order to accomplish this result, the pitting plate 19 is formed in sections 19ª and 19ᵇ which are adjustably secured to the frame 1 by means of bolts 39 which pass through slots formed in the pitting plate sections 19ª and 19ᵇ into the frame 1.

By releasing the bolts or screws 39 and sliding the plates along the frame 1, the width or size of the opening 18 in the plate 19 may be adjusted to accommodate for different sized pits, and also may be adjusted to such position that the pitting knife will just clear the edges of the plates in operation.

In order to hold the knife shank 21 from rotation relative to the hollow shaft 23, a cross pin 15 is passed through the hollow shaft 23 and shank 21.

Having fully described our invention, it is to be understood that we do not wish to be limited to the details herein set forth, but our invention is of the full scope of the appended claims.

We claim:

1. In a device of the class described, a pitting knife including a blade and a shank, a hollow shaft in which the shank is mounted and secured, a sleeve surrounding the hollow shaft for a portion of its length, means for connecting the hollow shaft with the sleeve to permit a rocking movement of the shaft within the sleeve, and means spaced from the latter said means for adjusting the position of the shaft within the sleeve.

2. In a device of the class described, the combination of a knife including a curved blade and a shaft extending from the curved blade, means for rotating the knife, bearing means for the shank rotatably supporting the knife, a wheel journaled eccentrically on the shank, means for revolving the wheel at a relatively high speed to oscillate the knife, and means mounted at the opposed ends of the bearing means for adjusting the axial position of the knife shank within the bearing to adjust the path of the movement of the curved blade as it is rotated.

3. In a device of the class described, the combination of a knife including a curved blade and a shank extending from the curved blade, means for rotating the knife, bearing means for the shank rotatably supporting the knife, and means mounted within the bearing means for adjusting the axial position of the knife shank within the bearing means to adjust the path of movement of the curved blade as the knife is rotated.

4. In a fruit pitter, the combination of a pitting knife having a curved portion and a shank, bearing means for rotatably supporting the shank including adjustable means for supporting the shank of the knife within the bearing means in a manner to permit axial adjustment of the knife shank transversely with respect to the axis of the bearing.

5. In a fruit pitter, the combination of a pitting knife having a curved portion and a shank, means mounted on the shank for vibrating the knife, bearing means for rotatably supporting the knife shank including adjustable means for supporting the shank of the knife within the bearing means in a manner to permit axial adjustment of the knife shank relative to the axis of the bearing.

6. In a fruit pitter, the combination of a pitting knife having a curved portion and a shank, means for rotatably supporting the shank within a hollow shaft, means for securing the hollow shaft to the shank, including means for holding the shank within the hollow shaft against axial translation relative thereto by permitting rocking movement of the shank within the hollow shaft, and means spaced from the latter said means for adjusting the axial position of the shank within the hollow shaft.

7. In a device of the class described, the combination of a contact means having an opening, a curved pitting knife operable through the opening to sever the pit from a fruit held in contact with the contact means, the curved pitting knife having a shank, a sleeve mounted on the shank and secured thereto, a wheel mounted on the shank and having an elongated hub extending into the sleeve, said wheel being independently rotatable on and with reference to the said shank, a bearing sleeve, means for pivotally securing the said first named sleeve within the bearing sleeve at one end of the bearing sleeve, means for adjustably securing the said first named sleeve within the bearing sleeve at the opposite end of the bearing sleeve, a carrier bearing for rotatably supporting the said bearing sleeve, means for rotating the bearing sleeve, and means for rotating the wheel relative to the shank at a comparatively high rate of rotation.

8. In a device of the class described, the combination of a contact means having an opening, a curved pitting knife operable through the opening to sever a pit from a fruit held in contact with the contact means, the curved pitting knife having a shank, a sleeve mounted on the shank and secured thereto, a bearing sleeve, means for pivotally securing the said first named sleeve within the bearing sleeve at one end of the bearing sleeve, means for adjustably securing the said first named sleeve within the bearing sleeve at the opposite end of the bearing sleeve, a carrier bearing for rotatably supporting the bearing sleeve, and means for rotating the bearing sleeve to rotate the curved pitting knife.

9. In a device of the class described, the combination of a contact means having an opening, a curved pitting knife operable through the opening to sever a pit from the fruit held in contact with the contact means, a curved pitting knife having a shank, a sleeve mounted on the shank and secured thereto, means operatively connected with the shank of the curved pitting knife to impart a vibratory motion to the curved pitting knife, a bearing sleeve, means for pivotally securing the said first named sleeve within the bearing sleeve, means spaced from the last said means for adjustably securing the said first named sleeve within the bearing sleeve, a carrier bearing for rotatably supporting the bearing sleeve, and means for rotating the bearing sleeve to rotate the curved pitting knife.

PHILIP L. BUSH.
FRANK RUEDIGER.